(12) United States Patent
Nagumo et al.

(10) Patent No.: US 7,587,562 B2
(45) Date of Patent: Sep. 8, 2009

(54) DATA DUPLICATION SYSTEM, DATA DUPLICATION METHOD AND PROGRAM

(75) Inventors: Kazuyuki Nagumo, Tokyo (JP); Naoki Soeda, Tokyo (JP)

(73) Assignee: NEC Corporation, Tokyo (JP)

( * ) Notice: Subject to any disclaimer, the term of this patent is extended or adjusted under 35 U.S.C. 154(b) by 361 days.

(21) Appl. No.: 11/384,412

(22) Filed: Mar. 21, 2006

(65) Prior Publication Data
US 2006/0218346 A1 Sep. 28, 2006

(30) Foreign Application Priority Data
Mar. 22, 2005 (JP) .............................. 2005-081935

(51) Int. Cl.
G06F 12/00 (2006.01)
(52) U.S. Cl. ...................................... 711/162; 711/113
(58) Field of Classification Search ................ 711/113, 711/162, 161, 165, 170, 156, 112
See application file for complete search history.

(56) References Cited
U.S. PATENT DOCUMENTS
6,338,126 B1 * 1/2002 Ohran et al. ................ 711/162
6,606,683 B2 * 8/2003 Mori .......................... 711/114
6,983,352 B2 * 1/2006 Keohane et al. ............. 711/162
2004/0260894 A1 * 12/2004 Keohane et al. ............. 711/162

FOREIGN PATENT DOCUMENTS
JP 2003-280964 10/2003

* cited by examiner

Primary Examiner—Pierre-Michel Bataille
(74) Attorney, Agent, or Firm—Young & Thompson

(57) ABSTRACT

It is to provide a data storage system which causes no delay in the access performance of a master volume in the snapshot action of a disk array subsystem. The data duplication system comprises a temporary data duplication control device and a data duplication control device. The temporary data duplication device functions in such a manner that the master volume and a buffer volume that is built between the master volume and a snapshot volume keep the same volume image. The data duplication control device functions to minimize the I/O load upon the master volume by switching the master volume and the buffer volume as appropriate as the actual data reference target of the snapshot volume.

9 Claims, 17 Drawing Sheets

26 (DATA DUPLICATION CONTROL DEVICE)

261 (PROPERTY MANAGING TABLE)

| LV NO | PROPERTY |
|---|---|
| LV 0 | MASTER |
| LV 1 | BUFFER |
| LV 2 | SNAPSHOT |
| LV 3 | COMMON |
| ... | ... |
| LV x | — |

263 (DIFFERENCE MANAGING TABLE)

| PAGE NO | LV0 | LV1 | LV2 | LV3 | ... | LVx |
|---|---|---|---|---|---|---|
| page 0 | — | — | 0 | — | ... | — |
| page 1 | — | — | 0 | — | ... | — |
| page 2 | — | — | 0 | — | ... | — |
| page 3 | — | — | 0 | — | ... | — |
| ... | ... | ... | ... | ... | ... | ... |
| page n | — | — | 0 | — | ... | — |

262 (VOLUME CORRESPONDENCE MANAGING TABLE)

| LV NO | SNAPSHOT | TEMPORARY DUPLICATION |
|---|---|---|
| LV 0 | LV 2 | LV 1 |
| LV 1 | — | LV 0 |
| LV 2 | LV 0 | — |
| LV 3 | — | — |
| ... | ... | ... |
| LV x | — | — |

264 (DUPLICATION REFERENCE TABLE)

| PAGE NO | LV0 | LV1 | LV2 | LV3 | ... | LVx |
|---|---|---|---|---|---|---|
| page 0 | — | — | 1 | — | ... | — |
| page 1 | — | — | 1 | — | ... | — |
| page 2 | — | — | 0 | — | ... | — |
| page 3 | — | — | 1 | — | ... | — |
| ... | ... | ... | ... | ... | ... | ... |
| page n | — | — | 1 | — | ... | — |

FIG.3

(TEMPORARY DATA DUPLICATION CONTROL DEVICE) 25

| PAGE NO | LV0 | LV1 | LV2 | LV3 | ... | LVx |
|---------|-----|-----|-----|-----|-----|-----|
| page 0  | —   | 1   | —   | —   | ... | —   |
| page 1  | —   | 1   | —   | —   | ... | —   |
| page 2  | —   | 1   | —   | —   | ... | —   |
| page 3  | —   | 1   | —   | —   | ... | —   |
| ...     | ... | ... | ... | ... | ... | ... |
| page n  | —   | 1   | —   | —   | ... | —   |

251 (TEMPORARY DIFFERENCE MANAGING TABLE)

FIG.4

(TEMPORARY DATA DUPLICATION CONTROL DEVICE) 25

| PAGE NO | LV0 | LV1 | LV2 | LV3 | ... | LVx |
|---------|-----|-----|-----|-----|-----|-----|
| page 0  | —   | 1   | —   | —   | ... | —   |
| page 1  | —   | 1   | —   | —   | ... | —   |
| page 2  | —   | 0   | —   | —   | ... | —   |
| page 3  | —   | 1   | —   | —   | ... | —   |
| ...     | ... | ... | ... | ... | ... | ... |
| page n  | —   | 1   | —   | —   | ... | —   |

251 (TEMPORARY DIFFERENCE MANAGING TABLE)

FIG.5

26 (DATA DUPLICATION CONTROL DEVICE)

| LV NO | PROPERTY |
|---|---|
| LV 0 | MASTER |
| LV 1 | BUFFER |
| LV 2 | SNAPSHOT |
| LV 3 | COMMON |
| ... | ... |
| LV x | — |

261 (PROPERTY MANAGING TABLE)

| PAGE NO | LV0 | LV1 | LV2 | LV3 | ... | LVx |
|---|---|---|---|---|---|---|
| page 0 | — | — | 0 | — | ... | — |
| page 1 | — | — | 0 | — | ... | — |
| page 2 | — | — | 0 | — | ... | — |
| page 3 | — | — | 0 | — | ... | — |
| ... | ... | ... | ... | ... | ... | ... |
| page n | — | — | 0 | — | ... | — |

263 (DIFFERENCE MANAGING TABLE)

| LV NO | SNAPSHOT | TEMPORARY DUPLICATION |
|---|---|---|
| LV 0 | LV 2 | LV 1 |
| LV 1 | — | LV 0 |
| LV 2 | LV 0 | — |
| LV 3 | — | — |
| ... | ... | ... |
| LV x | — | — |

262 (VOLUME CORRESPONDENCE MANAGING TABLE)

| PAGE NO | LV0 | LV1 | LV2 | LV3 | ... | LVx |
|---|---|---|---|---|---|---|
| page 0 | — | — | 1 | — | ... | — |
| page 1 | — | — | 1 | — | ... | — |
| page 2 | — | — | 0 | — | ... | — |
| page 3 | — | — | 1 | — | ... | — |
| ... | ... | ... | ... | ... | ... | ... |
| page n | — | — | 1 | — | ... | — |

264 (DUPLICATION REFERENCE TABLE)

DATA DUPLICATION SYSTEM, DATA DUPLICATION METHOD AND PROGRAM

BACKGROUND OF THE INVENTION

1. Field of the Invention

The present invention relates to duplication of data in a storage system such as a disk array subsystem. Particularly, it relates to a data duplication device system which can minimize access performance delay in a master volume caused by copy-on-write action when using snapshot technique, and minimize an influence of accesses, which are made by a pair of volumes in snapshot relation, to be imposed upon the access performance of each other.

2. Description of the Related Art

Recently, in accordance with more and more introduction of IT (Information Technology) into the social infrastructure, the data quantities held by companies or individuals have been dramatically increasing. Further, quality and value of the data itself has been increased due to spread of electronic commercial transaction, legalization of keeping data for authentication, etc. Under such conditions, an influence of data loss has been widely recognized, and backup technique as a way to prevent data loss in advance has been attracting great attentions.

A backup procedure of the mirroring method in a conventional disk array subsystem will be described. First, application such as a database that is making access to a master volume is stopped for securing a quiescent point of the master volume to be a target of backup. Then, a backup volume with the same capacity as that of the master volume will be generated for copying the entire data of the master volume to the backup volume. Upon completing the copy, the stopped application such as the database is restarted. At the same time, the data is read out from the backup volume and the read-out data is saved in a backup device such as a tape.

In this procedure, application is stopped once, and then, the backup volume is generated and the data is copied from the master volume to the backup volume. There is also another backup method where the backup volume is generated while the application is in action and the data is copied from the master volume to the backup volume for shortening the time between the point of securing the quiescent point and the point of synchronizing the master volume and the backup volume.

However, both methods require time for backup in accordance with the data quantity to be backed up from the point of securing the quiescent point of backup until completely copying the data of the master volume to the backup volume. Further, there often happens that a plurality of backup volumes are generated for the same master volume to be used for other than backup, such as data mining. In such case, there is consumed the data capacity that is several times the master volume.

In order to avoid such issues of the mirroring method, latterly, backup employing snapshot method has been used frequently (see, for example, Japanese Unexamined Patent Publication 2004-192133). FIG. 17 is a conceptual diagram for illustrating the operation principle of typical snapshot. Description thereof will be provided hereinafter by referring to this drawing.

The snapshot is a technique for keeping the snapshot-target volume to stay in the state (i.e. image) of the designated point. Specifically, assuming that snapshot of the snapshot-target volume, to which the data as shown in FIG. 17A is stored, for example, is taken, first, a snapshot duplication volume having the memory capacity equivalent to that of the snapshot-target volume is generated within a storage system in the manner as shown in FIG. 17A.

At a stage where the data "EE" is to be written to the storage area of the data "BB" of the snapshot-target volume, the data "BB" before update is stored in the same address as that of the snapshot duplication volume as shown in FIG. 17B. The snapshot duplication volume functions as a first-generation snapshot.

If a snapshot of the snapshot-target volume is taken again here, a snapshot duplication volume with the memory capacity equivalent to that of the snapshot-target volume is generated anew within the storage system as shown in FIG. 17B, and the snapshot duplication volume functions as a second-generation snapshot.

When the data "FF" is to be written further to the storage area of the data "CC" of the snapshot-target volume, the data "CC" before update is stored in the same address as that of the snapshot duplication volume that functions as the second-generation snapshot in the manner as shown in FIG. 17C, while keeping the contents of the snapshot duplication volume that functions as the first-generation snapshot as in FIG. 17B or FIG. 17C.

There has been simply described regarding the series-type snapshot by referring to FIG. 17. In the case where the parallel-type snapshot is applied, however, the data "CC" is also stored in the first-generation snapshot in addition to the second-generation snapshot when writing the data "FF" in the storage area of the data "CC" of the snapshot-target volume as shown in FIG. 17C.

In the volume duplication method utilizing the snapshot technique, it only needs to define the volume for holding only the update data of the snapshot-target volume immediately after the disk array subsystem receives a snapshot command. Thus, it looks on the appearance that the backup-target volume can be duplicated instantly.

Next, by referring to FIG. 11-FIG. 13, there will be described an example of the specific constitution of a conventional data duplication apparatus which employs the snapshot method.

As shown in FIG. 11, a conventional disk array subsystem 100 has a constitution which comprises: a master volume 101, a virtual volume (referred to as "snapshot volume" hereinafter) 102 with the same capacity as that of the master volume 101 that actually has no physical capacity, and a volume (referred to as a "common volume" hereinafter) 103 for storing the data of the snapshot volume 102 secured in a storage area. Further, it is provided with a data duplication control device 104 for managing data access to the snapshot volume 102, and an address conversion device 105 for managing an actual storage target of the duplication data.

As shown in FIG. 12, the data duplication control device 104 comprises: a property managing table 121 for managing volume properties of the master volume, the snapshot volume, the common volume, etc.; a volume correspondence managing table 122 that holds the snapshot relations between the volumes; and a difference managing table 123 for managing the difference between the master volume 101 and the snapshot volume 102.

As shown in FIG. 13, the address conversion device 105 comprises a directory 131 that holds actual storage address of the snapshot volume 102, and an allotment managing table 132 for managing the availability of the common volume 103.

Next, action of the conventional disk array subsystem shown in FIG. 11 will be described by referring to FIG. 14-FIG. 16.

As the procedure for duplicating the volume, in step 140 of FIG. 14, first, the disk array subsystem 100 shown in FIG. 11 generates the common volume 103 within the storage area and, in accordance with this, the data duplication control device 104 initializes the property managing table 121 and the allotment managing table 132. That is, the data duplication control device 104 shown in FIG. 12 sets the common property in the property that corresponds to "LV2" of "LV No." in the table 121. Further, the address conversion device 105 shown in FIG. 13 sets the value "0" in LV2 of the allotment managing table 132 for indicating that the common volume 103 is not used.

Subsequently, in step 141 of FIG. 14, the disk array subsystem 100 generates the master volume 101 and the snapshot volume 102 with the same memory capacity as that of the master volume 101 within the storage area. FIG. 11 shows the state within the storage area of the disk array subsystem 100 at the point where the processing of the step 140 and the step 141 shown in FIG. 14 is completed.

When the processing of the disk array subsystem 100 has proceeded to the step 141 shown in FIG. 14, and the disk array subsystem 100 receives a snapshot command in the step 142 of FIG. 14, the data duplication control device 104 initializes the property managing table 121, the volume correspondence managing table 122 and the difference managing table 123 according to the command (step 143). That is, as shown in FIG. 12, the data duplication control device 104 sets the master property in "LV0" of the property managing table 121 and the snapshot property in "LV1". As shown in FIG. 12, the data duplication control device 104 sets "LV1" in "LV0" of the snapshot in the volume correspondence managing table 122 while setting "LV0" in "LV1" of the snapshot, in order to record in the volume correspondence managing table 122 that the "LV0" and "LV1" are in the snapshot-relation. As shown in FIG. 12, the data duplication control device 104, for corresponding to "LV1" of the snapshot volume 102 in FIG. 11, sets the value "0" in "LV1" of the difference managing table 123 for indicating that the snapshot volume shown in FIG. 11 does not hold data.

Further, in step 143 of FIG. 14, the address conversion device 105 sets in the directory 131, as shown in FIG. 13, "null" value for indicating that a storage space of the common volume 103 shown in FIG. 11 is not allotted to the snapshot volume 102.

Now, by referring to FIG. 15, there will be described the procedure of the processing when the disk array subsystem 100 receives a write command under the state where the processing has proceeded to the step 143 of FIG. 14.

When the disk array subsystem 100 receives the write command in FIG. 15, the data duplication control device 104 shown in FIG. 12 refers to the property managing table 121 in step 150 of FIG. 15 according to the write command. Then, in step 151 of FIG. 15, the data duplication control device 104 judges whether the received command is a command for the master volume 101 or for a command for the snapshot volume 102.

When it is judged as the write command for the snapshot volume 102, the data duplication control device 104 ends the processing without writing the data. This is the processing in accordance with the operation to keep the duplication of the master volume at the point where the snapshot volume 102 receives the snapshot command, e.g. processing for the case of backup, etc. In other operation forms, data may be written to the snapshot volume 102 as requested by the write command.

When it is judged that the command is the write command for the master volume 101, the data duplication control device 104, in step 152 of FIG. 15, specifies the snapshot volume 102 as a pair of the master volume 101 by referring to the volume correspondence managing table 122.

After specifying the snapshot volume 102, the data duplication control device 104 judges in step 153 of FIG. 15 whether or not there is data in the writing request address of the specified snapshot volume 102 based on the difference managing table 123 shown in FIG. 12.

When it is judged that there is the data in the snapshot volume 102 in step 154, the data duplication control device 104 advances the processing to step 159 of FIG. 15 for writing the data to the master volume 101, and ends the processing.

When it is judged in step 154 that there is no data in the snapshot volume 102, the data duplication control device 104 outputs a signal of the judgment result to the address conversion device 105. Upon receiving the signal from the data duplication control device 104, the address conversion device 105 shown in FIG. 13 searches the allotment managing table 132 shown in FIG. 13B, and determines the area to be used this time among the unused area of the common volume 103 (step 155 of FIG. 15).

In step 156 of FIG. 15, the address conversion device 105 copies the existing data currently present in the writing request address of the master volume 101 to the unused area of the common volume 103 shown in FIG. 11. Then, in step 157 of FIG. 15, the address conversion device 105 sets "1", the value indicating that it is being used, in a corresponding column of the allotment managing table 132 as shown in FIG. 13, and sets the address of the unused area in the corresponding column of the directory 131. Subsequently, upon receiving the information from the address conversion device 105, the data duplication control device 104 sets "1", the value indicating that there is data, in the corresponding column of the difference managing table 123 shown in FIG. 12 in step 158 of FIG. 15, writes the data to the master volume 101 (step 159), and ends the processing.

Next, by referring to FIG. 16, there will be described the processing procedure in the case where the disk array subsystem 100 receives a read command.

Referring to FIG. 16, when the disk array subsystem 100 receives a read command, the data duplication control device 104 shown in FIG. 12 refers to the property managing table 121 shown in FIG. 12 in step 160 of FIG. 16 according to the read command.

In step 161 of FIG. 16, the data duplication control device 104 judges whether the received command is a command for the master volume 101 or a command for the snapshot volume 102.

When it is judged that the command is for the master volume 101, the data duplication control device 104 shifts the processing to step 166 for reading out the data from the master volume 101, and ends the processing.

When the data duplication control device 104 judges in the step 161 of FIG. 16 that the received command is for the snapshot volume 102, the data duplication control device 104 refers to the difference managing table 123 shown in FIG. 12 in step 162 of FIG. 16, and judges whether or not there is data in the reading-out requested address of the snapshot volume 102 in step 163 of FIG. 16.

When the data duplication control device 104 judges that there is the data in the snapshot volume 102, the address conversion device 105, upon receiving the judgment result from the data duplication control device 104, refers to the directory 131 of FIG. 13 in step 165 of FIG. 16 for obtaining the address on the common volume 103 to which the data is stored. Upon receiving the address information from the address conversion device 105, the data duplication control device 104 reads out the data from the common volume 103, and ends the processing.

When the data duplication control device 104 judges that there is no data in the snapshot volume 102, the data duplication control device 104 refers to the volume correspondence managing table 122 (step 164 of FIG. 16), reads out the data from the master volume 101 as a pair of the snapshot volume 102 (step 166 of FIG. 16), and ends the processing.

As described above, in the snapshot method, when there is a write command issued to the master volume, it is judged, prior to the writing processing on the master volume, whether or not there is data in the snapshot volume stored in a page designated by the write command. When the data is not stored, it is necessary to copy the data of that page to the snapshot volume, which deteriorates the access performance to the master volume.

Furthermore, recently, there is introduced a system in which the snapshot volume is built using a magnetic disk device of ATA (AT attachment) standard in order to perform snapshot at low cost. In the case of such system, it is anticipated that the access performance to the master volume is extremely deteriorated.

Furthermore, as described above, the snapshot volume holds only the updated page of the master volume after receiving the snapshot command. Thus, when there is a read command including the pages other than the updated page being issued to the snapshot volume, there deteriorates the access performance to the master volume.

SUMMARY OF THE INVENTION

The first object of the present invention is to prevent deterioration of writing performance for the master volume when executing snapshot action. The second object of the present invention is that the accesses to the master volume do not obstruct the accesses to the snapshot volume, and the accesses to the snapshot volume do not to obstruct the accesses to the master volume.

In order to achieve the aforementioned objects, the data duplication system according to the present invention is a data duplication system used for a storage device which stores master data in a duplication data storage area when updating the master data. The data duplication system comprises: a temporary storage area secured in the storage device for temporarily storing the master data to be stored in the duplication data storage area; a temporary data duplication control device for storing the master data in the temporary storage area; and a data duplication control device for determining a read-out target of the master data when reading out the master data via the duplication data storage area.

In the present invention, for storing the master data in the duplication data storage area at the time of updating the master data, there is secured the temporary storage area for temporarily storing the master data to be stored in the duplication data storage area; the master data is stored in the secured temporary storage area; and a read-out target of the master data is determined when reading out the master data via the duplication data storage area.

The temporary data duplication device of the present invention may be built in a constitution which comprises a duplication data managing table that holds position of the master data to be duplicated to the temporary storage area, and starts duplication of the master data to the temporary storage area by judging bit in the duplication data managing table.

The data duplication control device of the present invention may be built in a constitution which comprises a read-out data managing table that holds a read-out target of data not stored in the duplication data storage area, and determines a storage-target of the master data by judging bit in the read-out data managing table.

In the above-described description, the present invention is built as hardware. However, the present invention may be built as a program for controlling a computer. The program for data duplication system is built in a constitution that allows a computer, which constitutes a data duplication system of a storage device that stores master data in a duplication data storage area when updating data of the maser data, to execute: a function of securing a temporary storage area in the storage device for temporarily storing the master data to be stored in the duplication data storage area; a function of temporarily storing the master data in the temporary storage area; and a function of determining a read-out target of the master data when reading out the master data via the duplication data storage area.

With the related art, it is necessary to access to the original data if there is no master data stored in the duplication data storage area when reading out the master data from the duplication data storage area, which obstructs other accesses made to the original master data. With the present invention, however, the master data is read out from the temporary data storage area if there is no master data stored in the duplication data storage area when reading out the master data from the duplication data storage area. Therefore, there is no interference with other access made to the original master data.

Further, when updating the original master data, it is necessary with the related art to store the master data in the duplication data storage area before update, which obstructs other accesses made to the original master data. With the present invention, however, the master data stored in the temporary data storage area is stored in the duplication data storage area, after updating the original master data. Therefore, there is no interference with other accesses made to the original master data. That is, copy of the data from the master volume to the snapshot volume is executed with background processing. Thus, it is possible to return a write completion response to the host immediately.

As described above, the present invention comprises the temporary data storage area, which temporarily holds the master data, provided between the original master data and the duplication data storage area. Thus, when there is a write request generated for the original master data, it is possible to cut the processing for copying the non-updated data to the duplication data storage area. Furthermore, when there is a read request for the duplication data storage area, it is possible to cut reading of data from the original master data. As a result, I/O load upon the master data can be dramatically decreased.

BRIEF DESCRIPTION OF THE DRAWINGS

FIG. 3 is a functional block diagram for showing a temporary data duplication control device (I) of the disk array subsystem according to the embodiment;

FIG. 4 is a functional block diagram for showing a temporary data duplication control device (II) of the disk array subsystem according to the embodiment;

FIG. 5 is a functional block diagram for showing a data duplication control device of the disk array subsystem according to the embodiment;

DETAILED DESCRIPTION OF THE PREFERRED EMBODIMENT

Hereinafter, an embodiment of the present invention will be described in detail by referring to the accompanying drawings.

Figure 1:
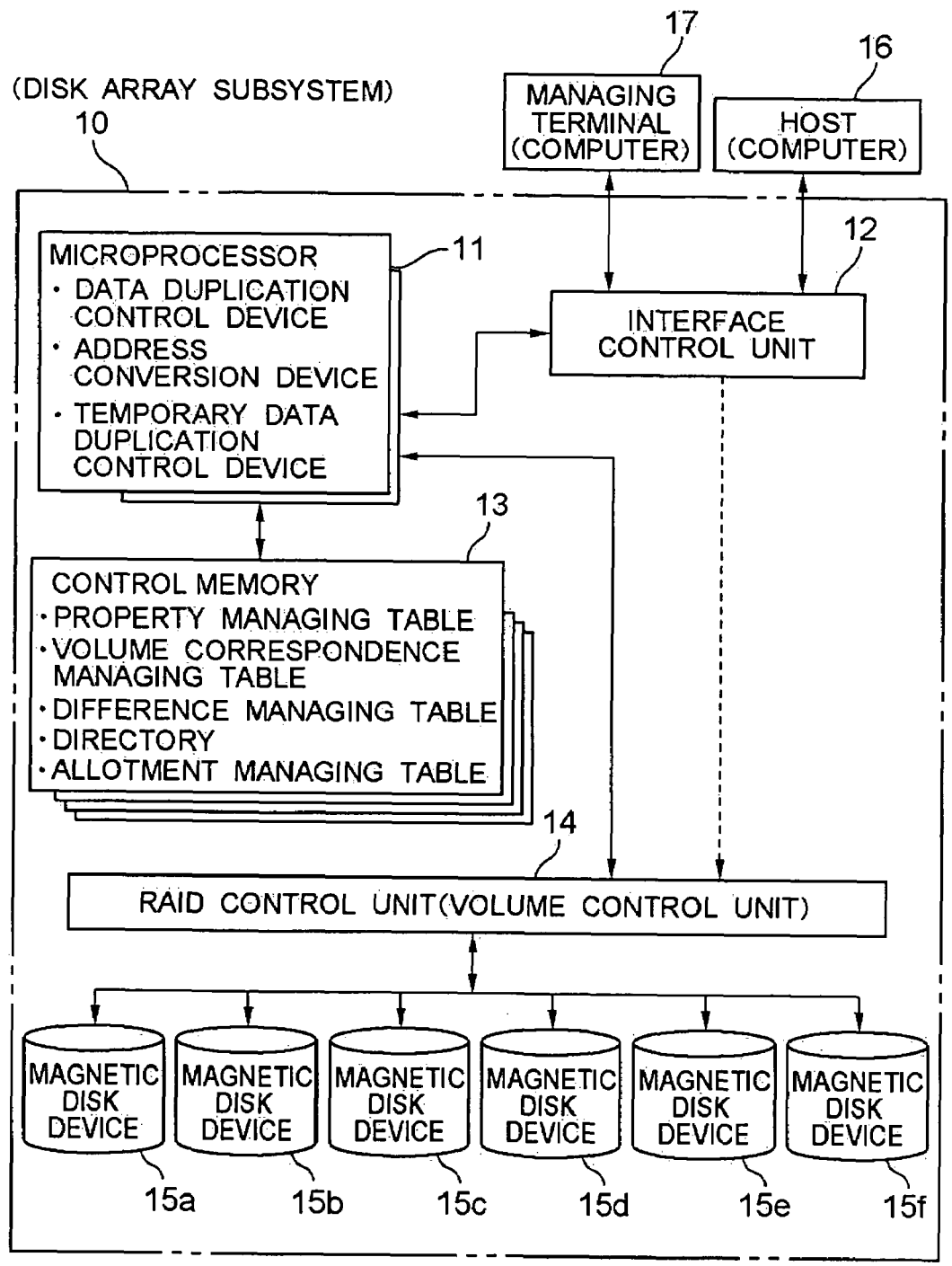
FIG. 1 is a schematic block diagram for showing a hardware structure according to an embodiment of a disk array subsystem according to the present invention.
Figure 2:
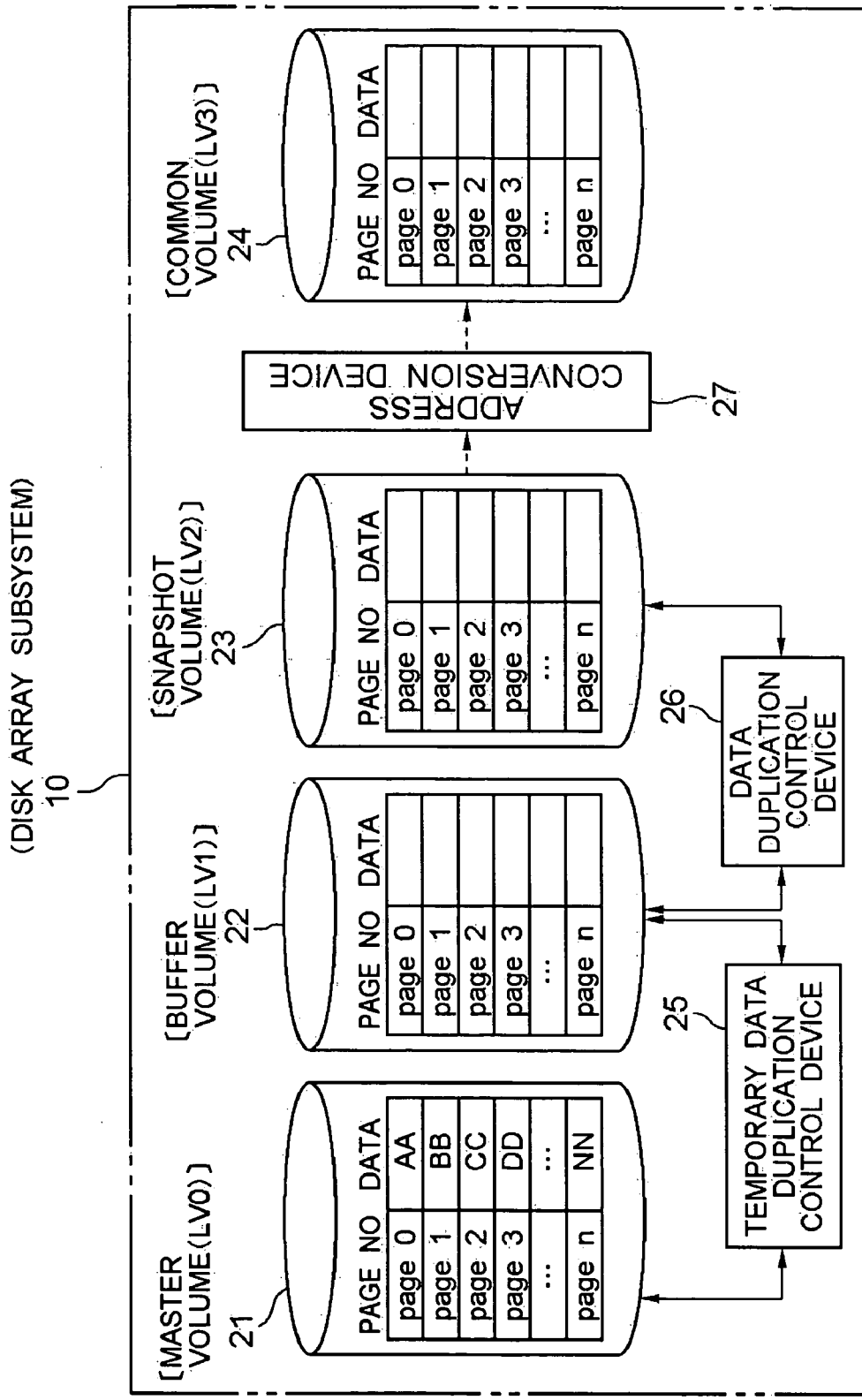
FIG. 2 is a functional block diagram for showing a specific example of snapshot action in the disk array subsystem of the embodiment.

As shown in FIG. 1, a data duplication system according to an embodiment of the present invention is used by being mounted onto a disk array subsystem 10 that is a storage device. The disk array subsystem 10 functions as a storage device that stores the master data in a duplication data storage area in accordance with update of master data. As shown in FIG. 2, the data duplication system according to the embodiment of the present invention comprises a temporary data duplication control device 25 and a data duplication control device 26 as a fundamental constitution.

The constitution of the disk array subsystem 10 will be described. As shown in FIG. 1, the disk array subsystem 10 performs processing including data backup and the like on high-order devices such as a managing terminal (computer) 17, a host computer 16, etc. by allotting a plurality of magnetic disk devices 15a-15f. The disk array subsystem 10 is built with computers, which comprises, as the fundamental constitution, a microprocessor (referred to as CPU hereinafter) 11, a control memory 13, an interface control unit 12, a RAID control unit 14, and the magnetic disk devices 15a-15f.

The interface control unit 12 is used for connecting the high-order devices such as the managing terminal 17 and the host computer 16, and the CPU 11. The RAID control unit 14 controls the volume of the storage areas constituted with the plurality of magnetic devices 15a-15f according to the instruction from the CPU 11, while being used for direct-connecting the interface control unit 12 and the magnetic disk devices 15a-15f. Further, the interface control unit 12 and the RAID control unit 14 control input/output of data between the high-order devices such as the managing terminal 17, the host computer 16, and the magnetic disk devices 15a-15f under control of the CPU 11.

The CPU 11 operates according to a control program stored in the control memory 13 for executing functions necessary as the disk array subsystem 10. Therefore, it is possible to use the CPU 11 as a device for achieving various functions through rewriting the control programs to be written in the control memory 13.

In accordance with the control program stored in the control memory 13, the CPU 11 of the disk array subsystem 10 shown in FIG. 1 comprises a data duplication control device 26, an address conversion device 27, and a temporary data duplication control device 25 built therein as the fundamental constitution of the data duplication system according to the embodiment of the present invention as shown in FIG. 2. The data duplication control device 26 has a function of determining an actual storage target of the data of the snapshot volume 23 shown in FIG. 2. The temporary data duplication control device 25 has a function of controlling to hold the duplication data temporarily at the time of duplicating the data. The CPU 11 is to build devices that are necessary to the disk array subsystem 10 in addition to the above-described devices.

The magnetic disk devices 15a-15f shown in FIG. 1 are in a constitution in which six devices are connected to build the storage area. However, it is not limited to such constitution. Practically, it may constitute storage areas as the volumes with logically independent magnetic disk devices 15a-15f, e.g. the master volume, the snapshot volume, the common volume, or a volume (referred to as a buffer volume hereinafter) with the same capacity as that of the master volume, which temporarily stores the duplication data. Further, under control of the RAID control unit 14, the magnetic disk devices 15a-15f may form a single volume (storage area) on the appearance over the plurality of magnetic disk devices or may provide the plurality of volumes on the appearance within a single magnetic disk device by setting partitions in a single magnetic disk device.

FIG. 2 is a functional block diagram illustrated by paying attention to the functional constitution of the disk array subsystem 10 shown in FIG. 1.

As shown in FIG. 2, the CPU 11 of the disk array subsystem 10 shown in FIG. 1 uses the plurality of magnetic disk devices 15a-15f by controlling the RAID control unit 14 to secure: a master volume 21 for storing the duplication original data; a snapshot volume 23 as a duplication volume of the master volume 21; a common volume 24 to which the duplication data is actually stored; and a buffer volume 22 that holds the duplication data temporarily when the data is duplicated from the master volume 21 to the snapshot volume 23. The buffer volume 22 functions as a temporary data storage area. Further, the common volume 24 functions as a duplication data storage area.

Further, as shown in FIG. 2, the CPU 11 of the disk array subsystem 10 of FIG. 1 builds the temporary data duplication control device 25, the data duplication control device 26 and the address conversion device 27 in the data duplication system according to the embodiment of the present invention.

As described above, the temporary data duplication control device 25 has a function of storing the master data to the buffer volume 22, i.e. functions to keep the same volume images between the master volume 21 and the buffer volume 22 that is built between the master volume 21 and the snapshot volume 23. Specifically, the temporary data duplication control device 25 has functions of: registering the section of the master volume 21 where writing occurred, so that the update of the master volume 21 can be reflected upon the buffer volume 22; and copying the data of registered section regularly from the master volume 21 to the buffer volume 22.

Furthermore, the temporary data duplication control device 25 has a function of copying the data before update to the buffer volume 22 prior to writing of the data to the master volume 21, when referring to the snapshot volume 23 for the data in the writing-occurred section of the master volume 21.

The data duplication control device 26 has a function of minimizing I/O load upon the master volume 21 through determining the actual data storage area in the snapshot volume 23 and appropriately switching the master volume 21 and the buffer volume 22 for referring the actual data of the snapshot volume 23. Specifically, the data duplication control device 26 has a function of judging whether or not the data of the snapshot volume 23 is stored in the common volume 24 and, when judged that it is not stored in the common volume 24, judges whether the data is stored to the master volume 21 or the buffer volume 22. When performing the above-described judgment, the data duplication control device 26 has a function of judging that the buffer volume 22 is where the data is stored, when the target data is stored in both the master volume 21 and the buffer volume 22.

In FIG. 2, there is only one each of the volumes being illustrated. However, it is merely an example and there is no limit set in the numbers of the master volume 21, the buffer volume 22, the snapshot volume 23, and the common volume 24.

FIG. 3 and FIG. 4 are functional block diagrams which pay attention to the functions of the temporary data duplication control device 25 shown in FIG. 2. As shown in FIG. 3 and FIG. 4, the temporary data duplication control device 25 comprises a temporary difference managing table 251 that holds position where the data stored in the master volume 21 and the data stored in the buffer volume 22 are not consistent. The temporary data duplication control device 25 includes the temporary difference managing table 251 that holds position of the master data to be duplicated to the buffer volume, and has a function of starting duplication of the master data to the buffer volume by judging bit in the temporary difference managing table 251. The temporary difference managing table 251 functions as a duplication data managing table that holds position of the master data to be duplicated to the buffer volume.

FIG. 5 is a functional block diagram paying attention to the functions of the data duplication control device 26 shown in FIG. 2. As shown in FIG. 5, the data duplication control device 26 comprises a property managing table 261, a volume correspondence managing table 262, a difference managing table 263, and a duplication reference table 264. The data duplication control device 26 manages the properties of the volumes such as the master volume 21, the buffer volume 22, the snapshot volume 23 and the common volume 24 by using the property managing table 261. The data duplication control device 26 holds the snapshot relations between the volumes by using the volume correspondence managing table 262. The data duplication control device 26 manages the difference between the master volume 21 and the snapshot volume 23 by using the difference managing table 263. When there is no difference between the master volume 21 and the snapshot volume 23, the data duplication control device 26 uses the duplication reference table 264 to judge whether the data held in the master volume 21 is valid or the data held in the buffer volume 22 is valid as the data of the snapshot volume 23. That is, the data duplication control device 26 comprises the difference managing table (read-out data managing table) 263 that holds a read-out target of the data not stored in the common volume 24. The data duplication control device 26 has a function of determining a storage target of the master data by judging the bit in the difference managing table 263.

Figure 6:
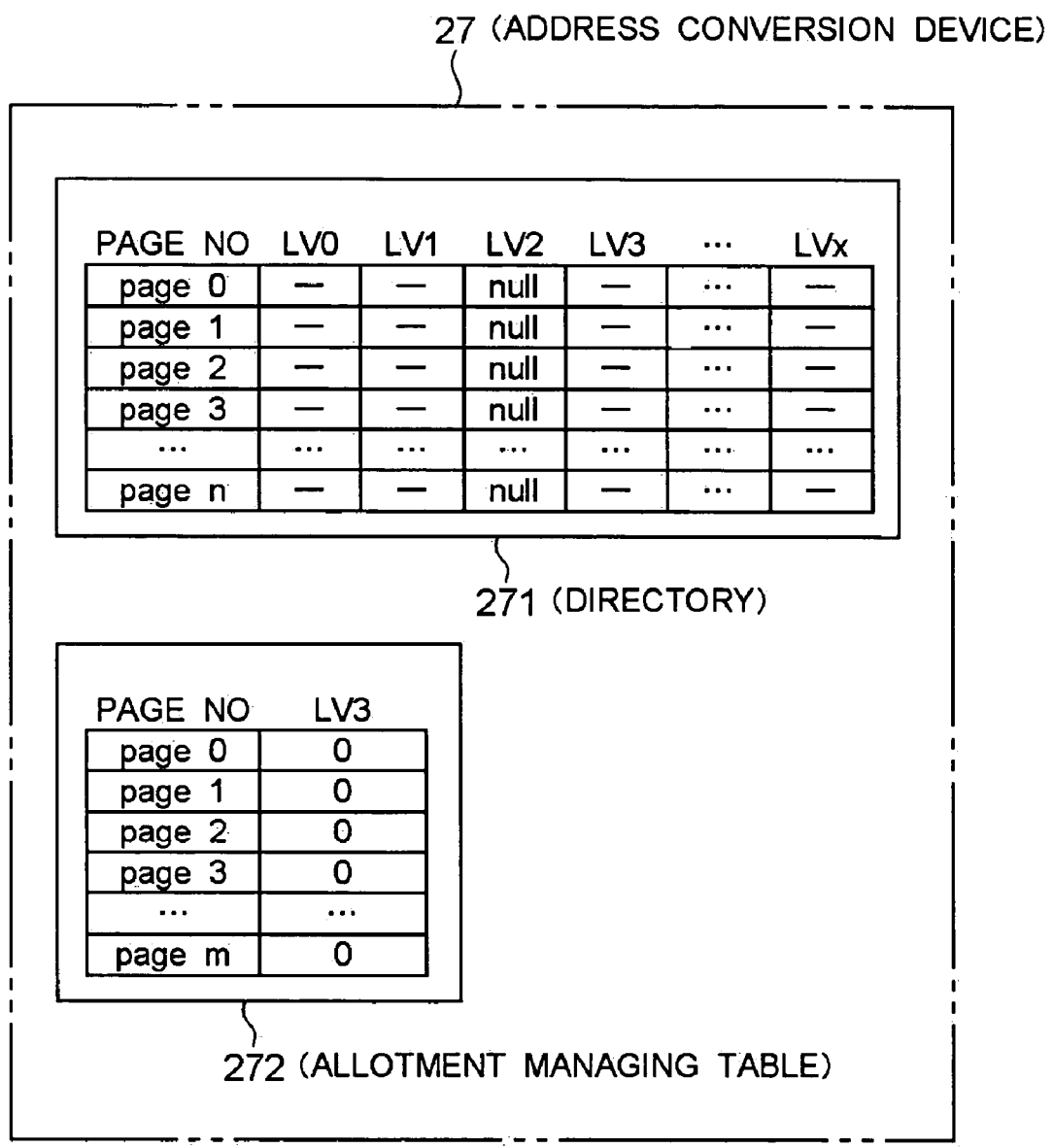
FIG. 6 is a functional block diagram for showing an address conversion device of the disk array subsystem according to the embodiment.
Figure 13:
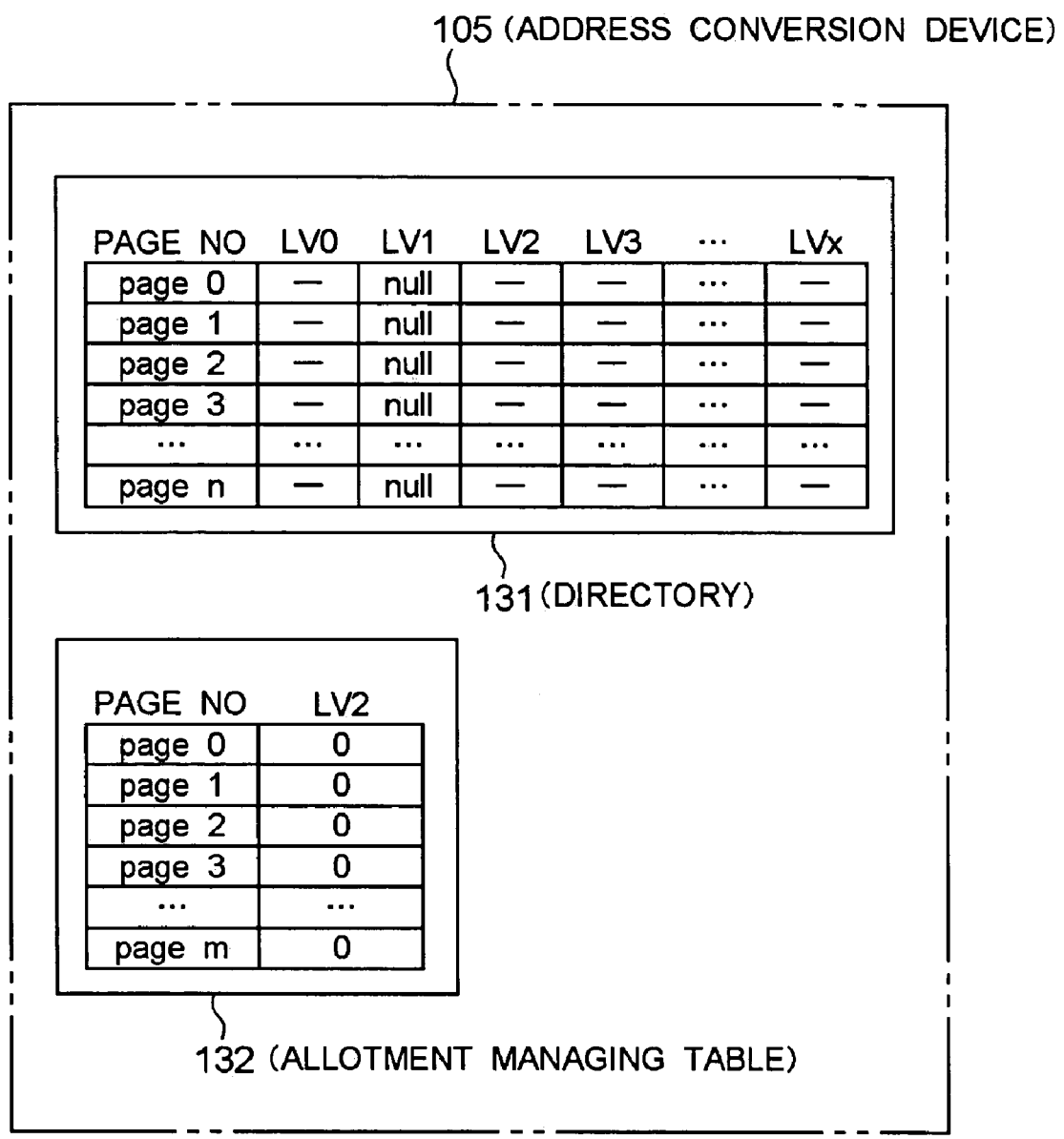
FIG. 13 is a functional block diagram for showing an address conversion device of the conventional disk array subsystem.
Figure 14:
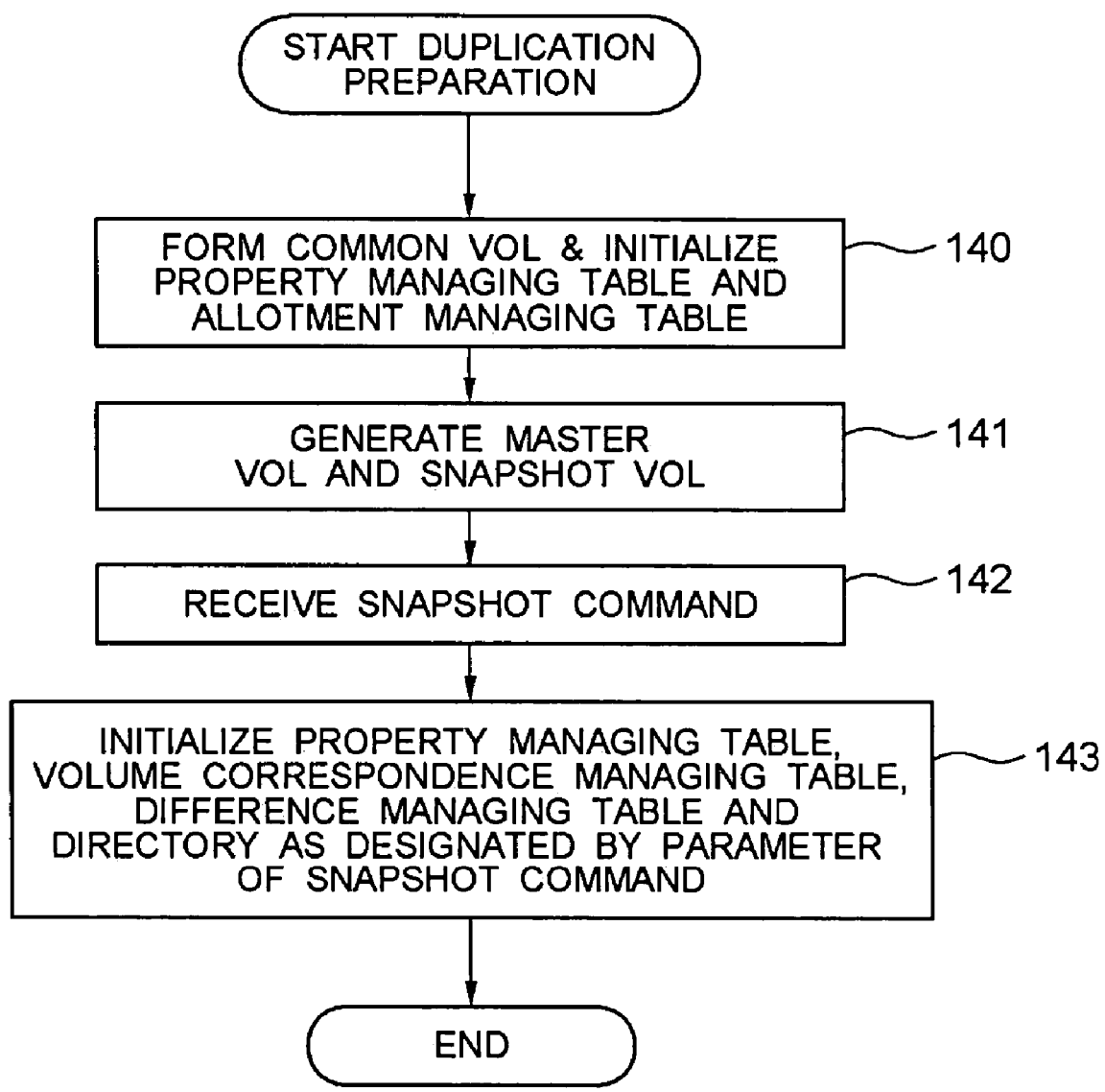
FIG. 14 is a flowchart for showing a duplication preparatory action of the conventional disk array subsystem.
Figure 15:
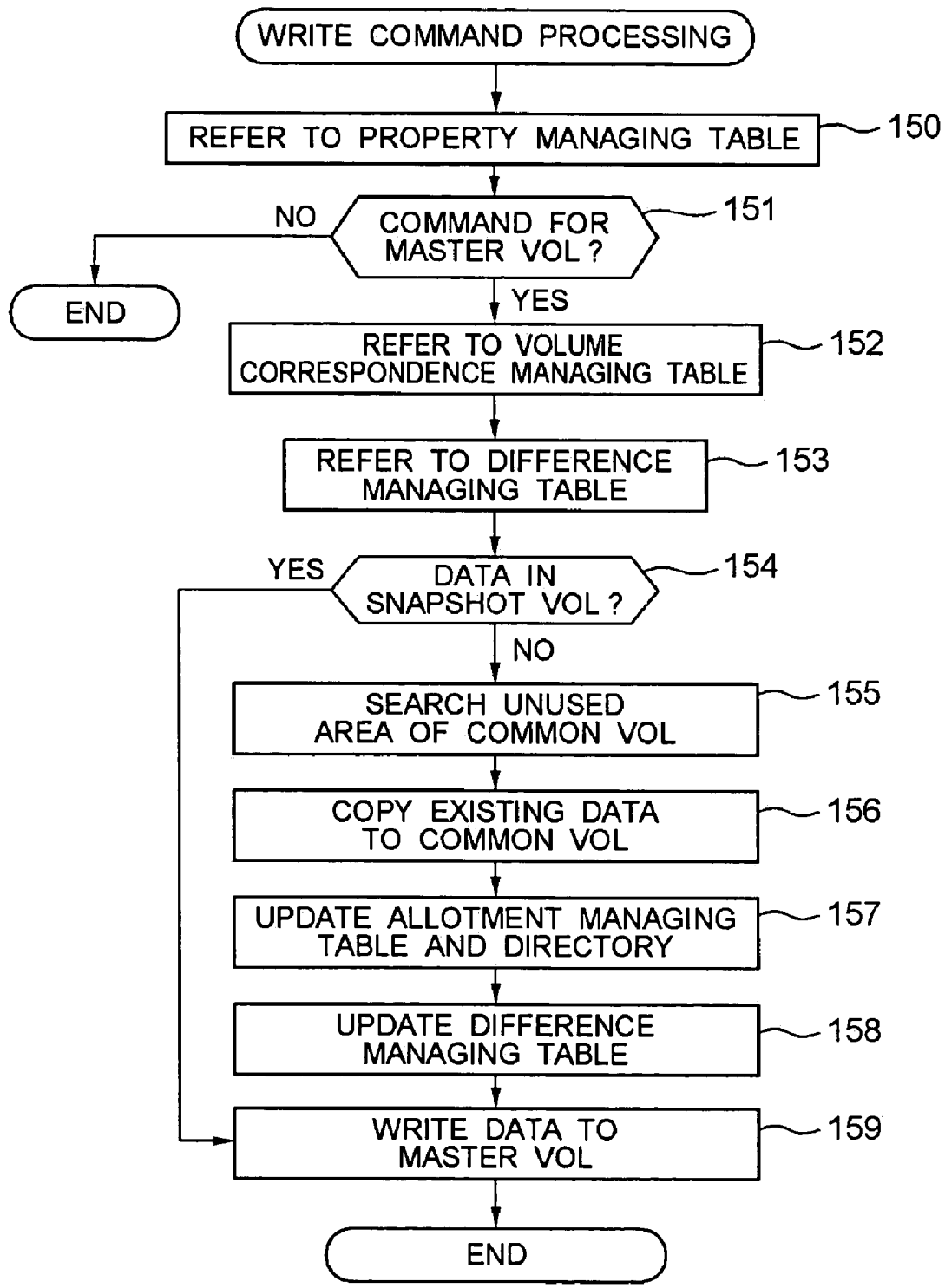
FIG. 15 is a flowchart for showing a write command action of the conventional disk array subsystem.
Figure 16:
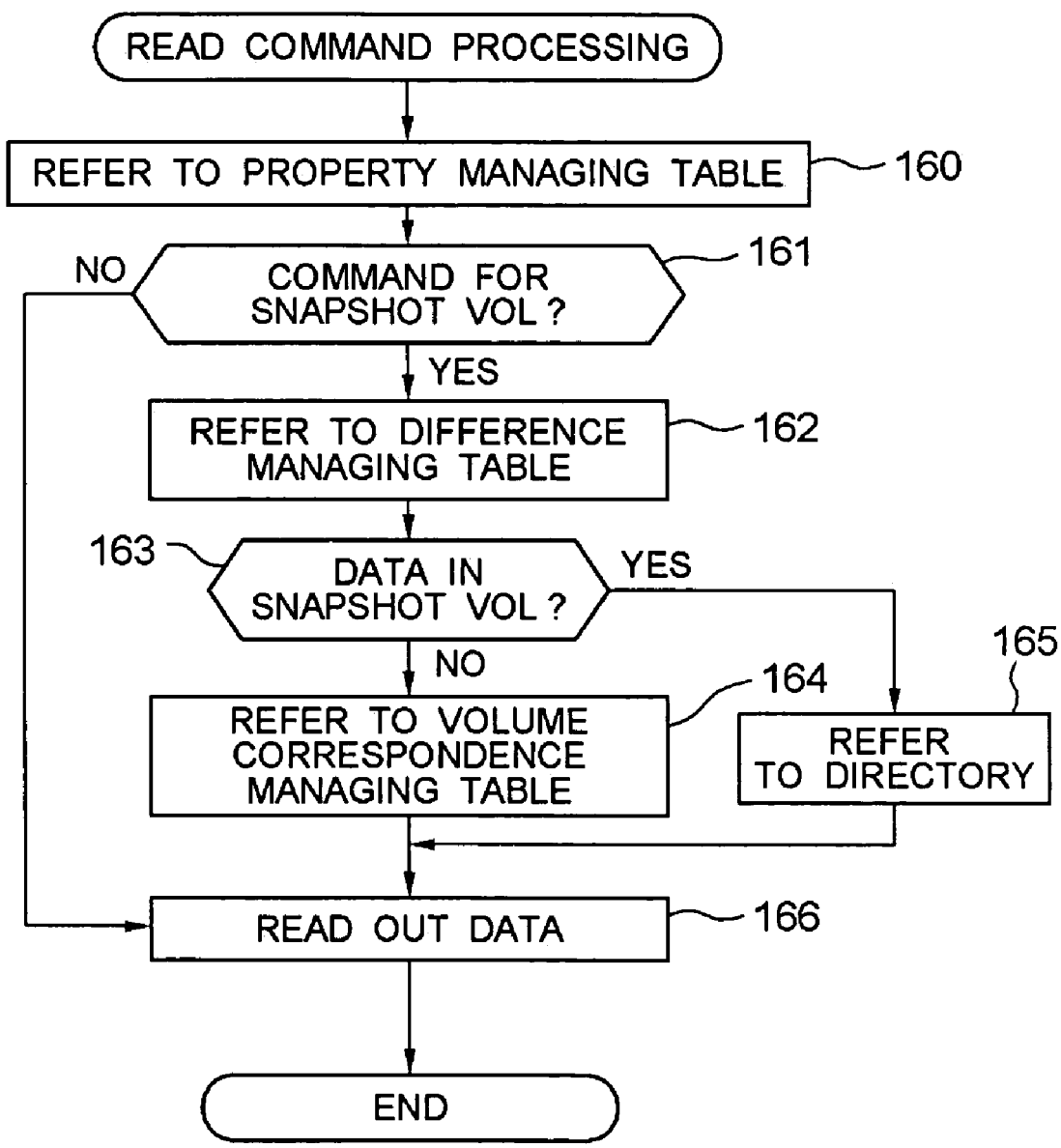
FIG. 16 is a flowchart for showing a read command action of the conventional disk array subsystem.
Figure 17:
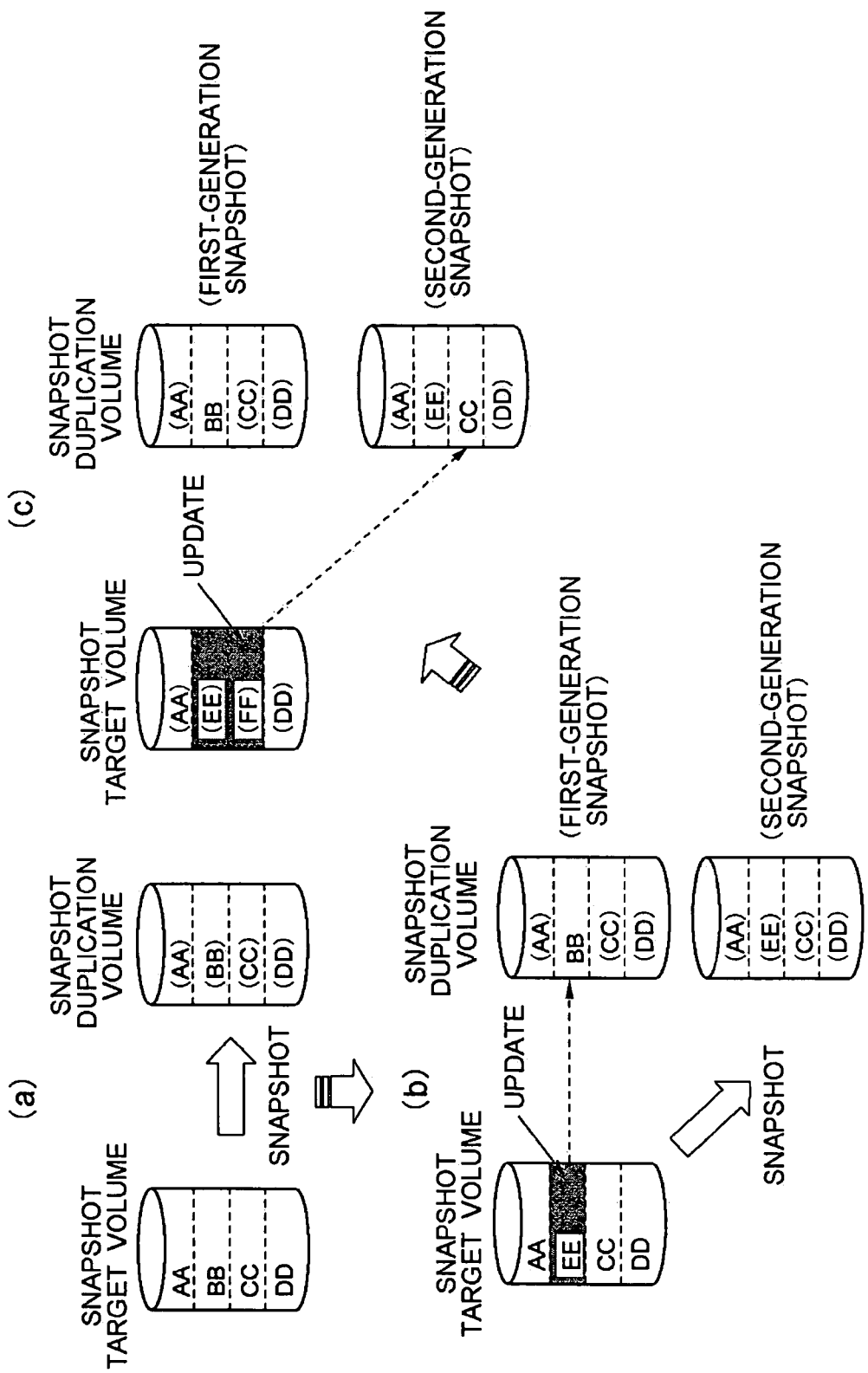
FIG. 17 is a conceptual diagram for showing the operation principle of an ordinal snapshot.

FIG. 6 is a functional block diagram paying attention to the functions of the address conversion device 27 shown in FIG. 2. As shown in FIG. 6, the address conversion device 27 comprises a directory 271 for holding the actual storage address of the snapshot volume 23, and an allotment managing table 272 for managing the availability of the common volume 24 like the conventional address conversion device 105 shown in FIG. 13.

The temporary difference managing table 251, the property managing table 261, the volume correspondence managing table 262, the difference managing table 263, the duplication reference table 264, the directory 271, and the allotment managing table 272 are held within the control memory 13 of the disk array subsystem 10. The temporary difference managing table 251 is managed by the data duplication control device 25. The property managing table 261, the volume correspondence managing table 262, the difference managing table 263, and the duplication reference table 264 are managed by the data duplication control device 26. The directory 271 and the allotment managing table 272 are managed by the address conversion device 27.

Next, action of the disk array subsystem 10 shown in FIG. 1 will be described in detail by referring to a flowchart shown in FIG. 7.

Figure 7:
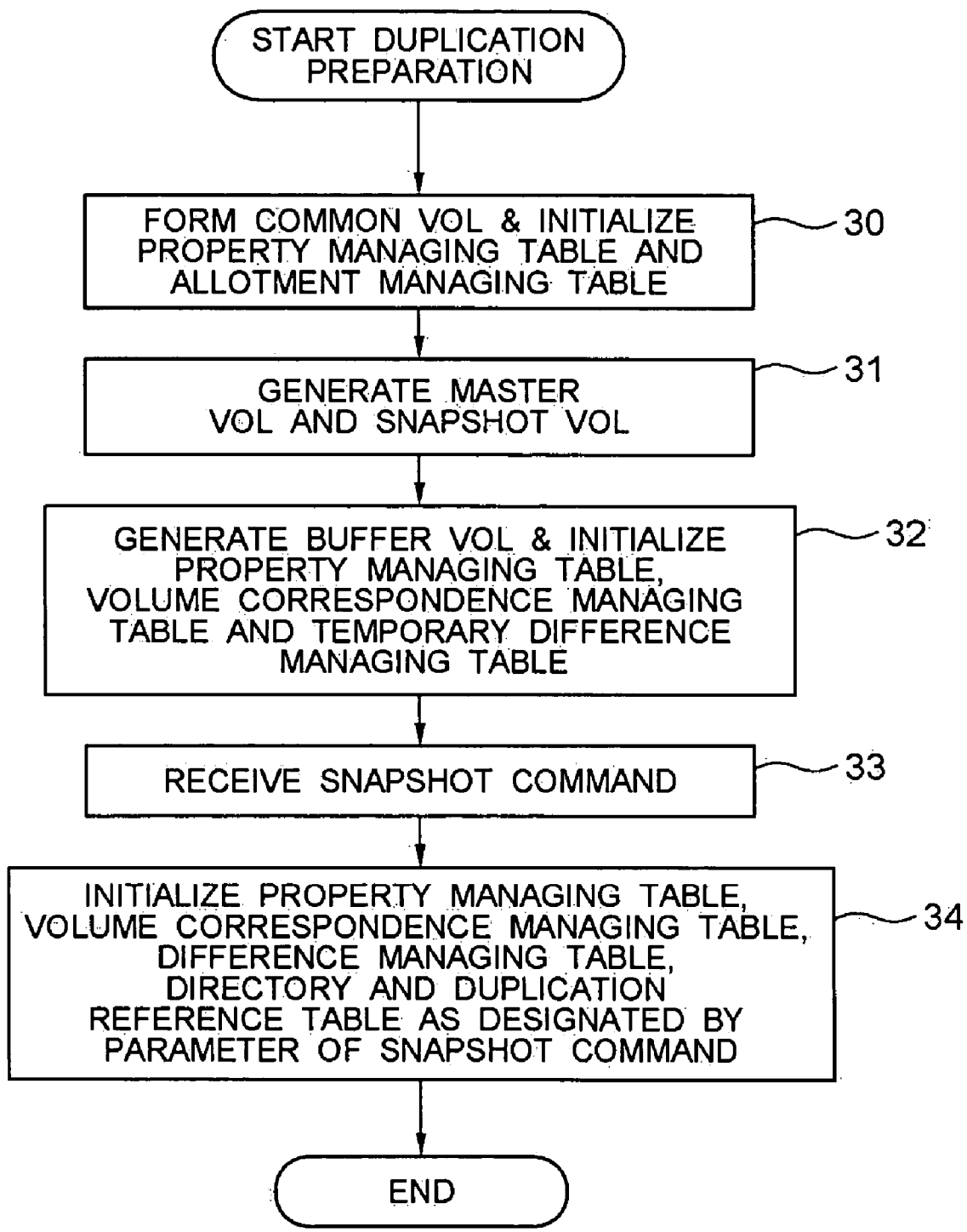
FIG. 7 is a flowchart for showing a duplication preparatory action of the disk array subsystem according to the embodiment.

As shown in FIG. 7, there is performed an advance preparation action for performing the snapshot action. As the advance preparation for the snapshot action, in step 30 of FIG. 7, the CPU 11 of the disk array subsystem 10 generates the common volume 24 shown in FIG. 2 in a storage area constituted with the magnetic disk devices 15a-15f by controlling the RAID control unit 14 shown in FIG. 1. Further, the data duplication control device 26 shown in FIG. 2 initializes the property managing table 261 shown in FIG. 5. Furthermore, the address conversion device 27 shown in FIG. 6 initializes the allotment managing table 272 shown in FIG. 6.

Specifically, the data duplication control device 26 sets information "common" in a column of "Property" which corresponds to "LV3" of "LV No." in the property managing table 261 shown in FIG. 5. The address conversion table 27 sets "0", the value indicating that the common volume 24 is unused" in a column of "LV3" in the allotment managing table 272 shown in FIG. 6. The memory capacity of the common volume 24 may be set at will. However, it is desirable to set the memory capacity of the common volume 24 by estimating the data quantity necessary for the immediate moment considering that it is where a plurality of snapshot volumes are actually stored.

After completing the above-described processing, the CPU 11 controls the RAID control unit 14 in step 31 of FIG. 7 to generate the master volume 21 and the snapshot volume 23 having the same memory capacity as that of the master volume 21 in the storage area constituted with the magnetic disk devices 15a-15f as in FIG. 2. It is noted here that the snapshot volume 23 functioning as the duplication data storage area has the same memory capacity as that of the master volume 21 on the appearance. However, the data of the snapshot 23 is actually stored in the common volume 24, so that the snapshot volume 23 itself does not consume the storage area. In other words, the snapshot volume 23 is only a volume built virtually within the disk array subsystem 10, thus having no substantial storage capacity. Further, the master volume 21 may be generated in step 31 of FIG. 7 or a volume already existing in the storage area of the magnetic disk devices 15a-15f may be designated for it. When designating the existing volume as the master volume, the volume having no snapshot relation therebetween may be designated. Alternatively, snapshot relation may be placed further on the master volume that is already in the snapshot relation.

After completing the above-described processing, the CPU 11 controls the RAID control unit 14 in step 32 of FIG. 7 to generate the buffer volume 22 having the same memory capacity as that of the master volume 21 in the storage area constituted with the magnetic disk devices 15a-15f. It is distinctive in the embodiment of the present invention that the buffer volume 22 is provided in the midway between the master volume 21 and the snapshot volume 23.

In the step 32 of FIG. 7, the data duplication control device 26 initializes the property managing table 261 and the volume correspondence managing table 262 shown in FIG. 5. Further, the temporary data duplication control device 25 initializes the temporary difference managing table 251. That is, the data duplication control device 26 sets "master property" in a column of "Property" that corresponds to "LV0" of "LV No." of the property managing table 261, and sets "buffer property" in a column of "Property" that corresponds to "LV1" of "LV No.". The data duplication control device 26 sets "LV1" in a column of "Temporary duplication" that corresponds to "LV0" of "LV No." of the volume correspondence managing table 262, and sets "LV0" in a column of "Temporary duplication" that corresponds to "LV1" of "LV No." for indicating that "LV0" and "LV1" are in a relation of temporary duplication.

Further, as shown in FIG. 3, the temporary data duplication control device 25 sets the value "1" in columns of pages 0 to page n of "Page No." that correspond to "LV1" of the temporary difference managing table 251 for indicating that the data of the master volume 21 and the data of the buffer volume 22 are not consistent. The temporary data duplication control device 25 monitors the temporary difference managing table 251 regularly and, when detecting the value "1" for indicating the inconsistency as described above, operates to duplicate the inconsistent data from the master volume 21 to the buffer volume 22. Then, as shown in FIG. 4, the temporary data duplication control device 25 sets the value "0" in a column of page 2 in "Page No." that corresponds to "LV1" in the case of FIG. 4, i.e. a section where the duplication is completed from the master data 21 to the buffer volume 22, for indicating that the data is consistent.

FIG. 3 and FIG. 4 illustrate an example of the state where the temporary data duplication control device 25 manages the temporary difference managing table in the manner as described above. As shown in FIG. 3, the CPU 11 of the disk array subsystem 10 generates the buffer volume 22 in the storage area constituted with the magnetic disk devices 15a-15f, and the temporary data duplication control device 25 sets "1", the initial value, in the temporary data managing table 251. FIG. 4 shows the state where the temporary data duplication control device 25 has detected "1" in the temporary difference managing table 251, and duplicated the data of "page 2" of "Page No." from the master volume 21 to the buffer volume 22.

After completing the above-described processing, that is, when the disk array subsystem 10 receives a snapshot command in step 33 of FIG. 7 from a high-order device (16 or 17) through the interface control unit 12, the data duplication control device 26 initializes the property managing table 261, the volume correspondence managing table 262, the difference managing table 263, and the duplication reference table 264 shown in FIG. 5. Likewise, the address conversion device 27 shown in FIG. 2 initializes the directory 271 shown in FIG. 6.

Specifically, the data duplication control device 26 sets "snapshot" in a column of "Property" that corresponds to "LV3" of "LV No." in the property managing table 261 shown in FIG. 5. The data duplication control device 26 sets "LV2" in a column of "snapshot" that corresponds to "LV0" of "LV No." in the volume correspondence managing table 262 shown in FIG. 5 for indicating that "LV0" and "LV2" are in snapshot relation, and sets "LV0" in a column of "snapshot" that corresponds to "LV2" of "LV No." in the volume correspondence managing table 262 shown in FIG. 5 for indicating that "LV0" and "LV2" are in snapshot relation.

The data duplication control device 26 sets "0", the value for indicating that the snapshot volume 23 does not hold data, in columns of "page 0"-"page n" of "Page No." in "LV2", i.e. the snapshot volume 23 in the difference managing table 263 shown in FIG. 5. Duplication of the data of the snapshot volume 23, i.e. "page 2" of "Page No." in a column of "LV2", in the duplication reference table 264 is completed from the master volume 21 to the buffer volume 22. Thus, the data duplication control device 26 sets the value "0" in the column of "page 2" of "Page No." in "LV2" of the duplication reference table 264 for designating the buffer volume 22 as the data reference target, and sets the value "1" in columns of other pages, i.e. "page 0", "page 3"-"page n" of "Page No." that correspond to "LV2" in the duplication reference table 264 for referring to the master volume 21.

Further, the address conversion device 27 sets the "null" in columns of "page 0"-"page n" of "page number" that correspond to "LV2" of the directory 271 shown in FIG. 6 for indicating that there is no memory space of the common volume 24 allotted to the snapshot volume 23.

Initialization of the duplication reference table 264 shown in FIG. 5 performed by the data duplication control device 26 can also be achieved by copying the contents of the temporary difference managing table 251 at the point of receiving the snapshot command to the duplication reference table 264. An example of that state is illustrated in FIG. 5.

After completing the above-described processing, the snapshot volume 23 shown in FIG. 2 holds the volume image of the master volume 21 in the state of the point where the disk array subsystem 10 receives the snapshot command.

Next, by referring to FIG. 8, there will be described the processing of write command to the master volume generated after the disk array subsystem 10 receives the snapshot command.

Figure 8:
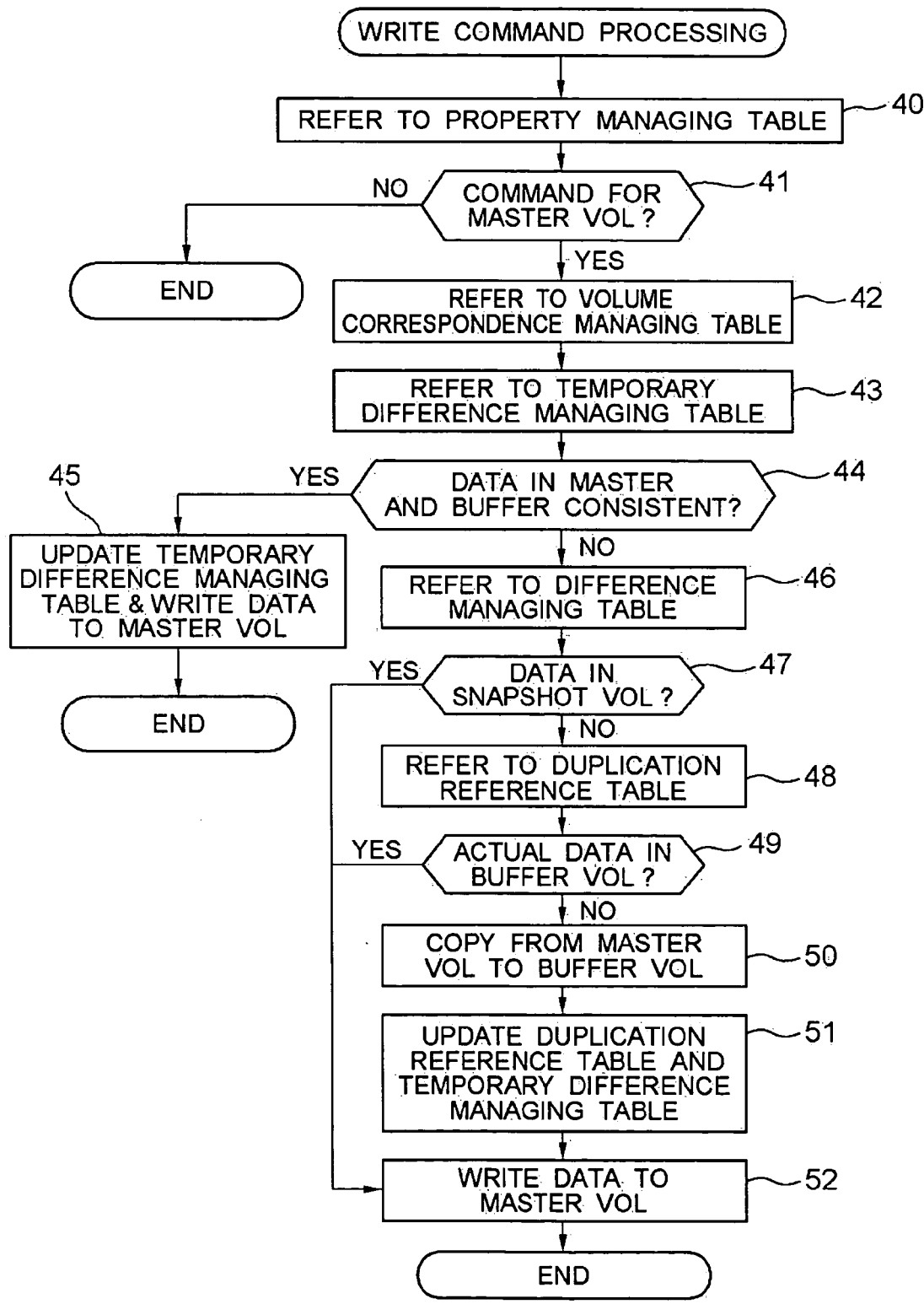
FIG. 8 is a flowchart for showing a write command action of the disk array subsystem according to the embodiment.

When the disk array subsystem 10 receives a write command for the master volume, the data duplication control device 26 refers to the property managing table 261 shown in FIG. 5 in step 40 of FIG. 8. In step 41 of FIG. 8, the data duplication control device 26 judges whether or not the write command is for the master volume 21.

When it is judged that the command is the write command for the master volume 21, the data duplication control device 26 refers to the volume correspondence managing table 262 in step 42 of FIG. 8, and specifies the buffer volume 22 and the snapshot volume 23 making a pair with the master volume 21.

After completing the processing of the data duplication control device 26, that is, in step 43 of FIG. 8, the temporary data duplication control device 25 refers to the temporary difference managing table 251 shown in FIG. 4, and judges in step 44 of FIG. 8 whether or not the data of "page 0"-"page n" of "Page No." in "LV0"-"LVx" of "LV No." that are designated by the write command are consistent for the master volume 21 and the buffer volume 22.

The page with the value of "0" in the temporary difference managing table 251 shown in FIG. 4, i.e. "page 2" of "Page No." in "LV1" of "LV No." in the case of FIG. 4, indicates that the data thereof are consistent since the value is "0". In that case, the temporary data duplication control device 25 advances the processing to step 45 of FIG. 8 where it sets, as shown in FIG. 3, the value "1" in a column of the corresponding page in the temporary difference managing table 251 for indicating the data inconsistency, and writes the data to the corresponding page of the master volume 21. Thereby, the write command is ended. An example of the case where the data of the master volume 21 and the data of the buffer volume 22 become inconsistent may be a case where the data of the same address as that of the master volume 21 is updated before completing the processing for mirroring the data of the master volume 21 to the buffer volume 22.

The data written to the master volume 21 is copied to the buffer volume 22 by the temporary data duplication control device 25. The action thereof will be described later.

The page with the value "1" in the temporary difference managing table 251 in FIG. 4 means that the data are inconsistent. In that case, the data duplication control device 26 advances the processing to step 46 of FIG. 8 for referring to the difference managing table 263, and judges in step 47 of FIG. 8 whether or not the snapshot volume 23 holds data.

When it is judged in the step 47 of FIG. 8 that the snapshot volume 23 holds the data, the data duplication control device 26 advances the processing to step 52 of FIG. 8. When the data duplication control device 26 judges that the snapshot volume 23 holds the data, the data of the master volume 21 and the buffer volume 22 at the time of write-command issuance is the data irrelevant to the volume image that is held by the snapshot volume 23. Thus, the data duplication control device 26 writes the data in the corresponding page of the master volume 21 (step 52), and ends the write command.

When the data duplication control device 26 judges in the step 47 of FIG. 8 that the snapshot volume 23 does not hold the data, the data duplication control device 26 refers to the duplication reference table 264 shown in FIG. 5 to judge whether the actual data of the volume image of the snapshot volume 23 is stored in the master volume 21 or in the buffer volume 22 in step 48 of FIG. 8.

When it is judged in step 49 of FIG. 8 that the actual data is in the buffer volume 22, the data duplication control device 26 shifts the processing to step 52 of FIG. 8 and writes the data in the corresponding page of the master volume 21 (step 52). Thereby, the write command is ended.

When it is judged in the step 49 of FIG. 8 that the actual data is in the master volume 21, the data duplication control device 26 shifts the processing to step 50 of FIG. 8. Then, the data duplication control device 26 performs processing for keeping the volume image of the snapshot volume 23 by copying the data of the master volume 21 to the buffer volume 22 before writing the data to the master volume 21.

Subsequently, the data duplication control device 26 shifts the processing to step 51 of FIG. 8 and updates the contents of the duplication reference table 264 by setting the value "0" in the duplication reference table 264 shown in FIG. 5 for indicating that the actual data of the volume image is in the buffer volume 22. Then, the data duplication control device 26 writes the data in the corresponding page of he master volume 21 (step 52), and ends the write command. Furthermore, in step 51 of FIG. 8, the temporary data duplication control device 25 updates the contents of the temporary difference managing table 251 by setting the value "0" in the temporary difference managing table 251 for indicating that the data of the master volume 21 and the data of the buffer volume 22 are consistent.

Next, by referring to FIG. 9, there will be described action of the temporary data duplication control device 25 while executing snapshot.

The action of the temporary data duplication control device 25 under snapshot is executed with the background processing. Thus, the action thereof does not obstruct the accesses to the master volume 21. The temporary data duplication control device 25 obtains the page position where the contents of the data between the master volume 21 and the buffer volume 22 are inconsistent through searching the temporary difference managing table 251 regularly, and copies the inconsistent data from the master volume 21 to the buffer volume 22.

Figure 9:
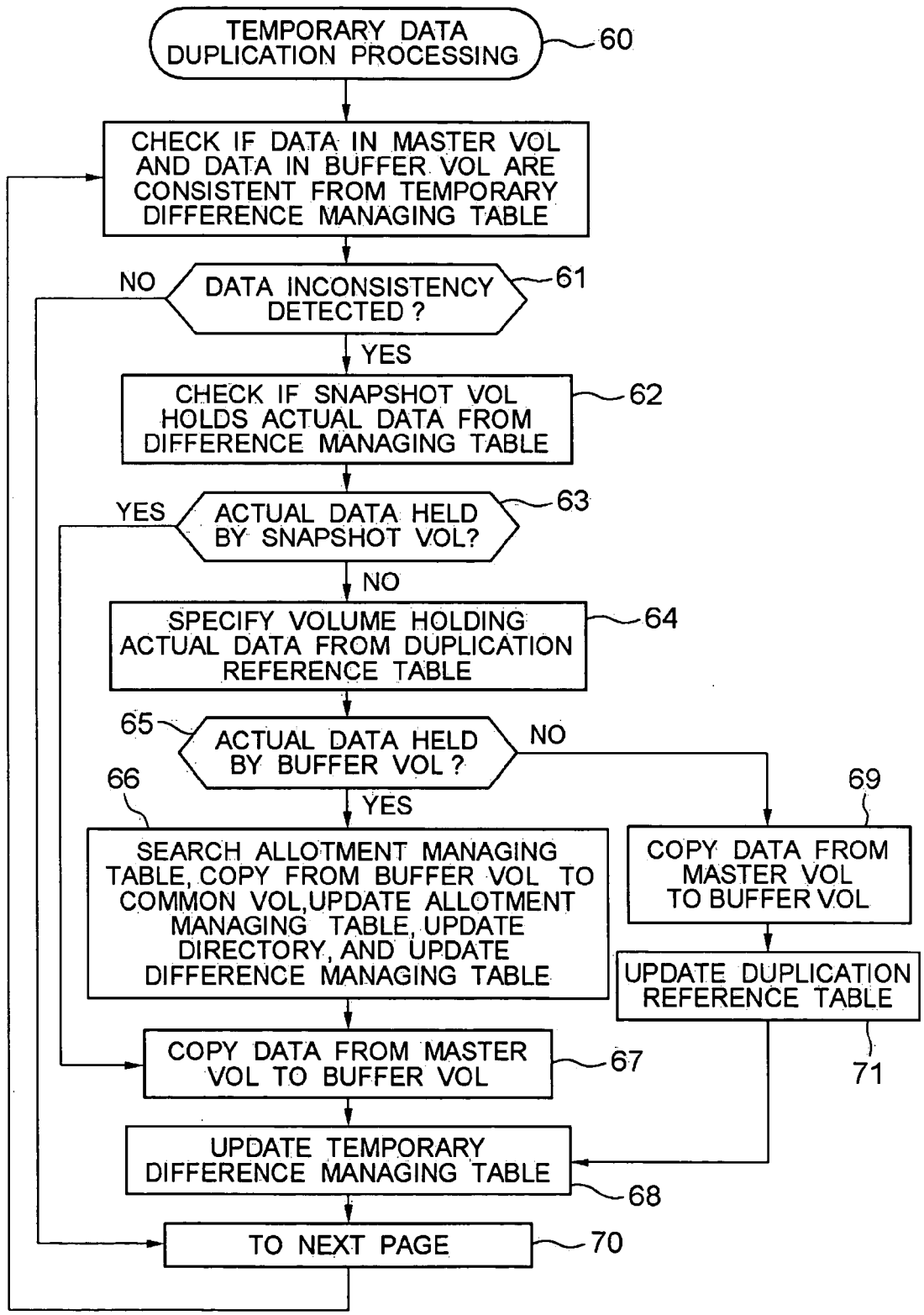
FIG. 9 is a flowchart for showing a temporary data duplication action of the disk array subsystem according to the embodiment.

First, in step 60 of FIG. 9, the temporary data duplication control device 25 checks the temporary difference managing table 251. When detecting "0", the value indicating that the data contents in the master volume 21 and in the buffer volume 22 are consistent, in any of the pages of "LV0"-"LVx" (NO in step 61), the data duplication control device 25 shifts the processing to step 70 of FIG. 9 and performs the processing for checking "0", the value indicating that the data contents in the master volume 21 and in the buffer volume 22 are consistent, on the next page by repeating a series of processing from the step 60 to step 68.

When the temporary data duplication control device 25, in the step 60 of FIG. 9, detects "1", the value indicating that the data contents in the master volume 21 and in the buffer volume 22 are inconsistent, in the temporary difference managing table 251, the processing is shifted to step 61 of FIG. 9. Then, the data duplication control device 26 checks the difference managing table 263 in step 62 of FIG. 9. When detecting "1", the value indicating that the snapshot volume 23 holds the actual data, in the corresponding page of the difference managing table 263 (step 63), the data duplication control device 26 shifts the processing to step 67 of FIG. 9 to copy the data from the master volume 21 to the buffer volume 22, and shifts the processing to step 68 of FIG. 9. In the step 68 of FIG. 9, the temporary data duplication control device 25 updates the contents of the temporary difference managing table 251 by setting the value "0" in the temporary difference managing table 251 for indicating that the data of the master volume 21 and the data of the buffer volume 22 are consistent. Then, the processing is shifted to step 70 of FIG. 9 and performs the processing for checking "0", the value indicating that the data contents in the master volume 21 and in the buffer volume 22 are consistent, on the next page by repeating a series of processing from the step 60 to the step 68.

When the value "0", indicating that the snapshot volume 23 does not hold the actual data, is detected in step 63 of FIG. 9, the processing is shifted to step 64 of FIG. 9. In the step 64 of FIG. 9, the data duplication control device 26 specifies the volume that holds the actual data by referring to the duplication reference table 264.

Subsequently, the processing is shifted to step 65 of FIG. 9. When judged that the buffer volume 22 holds the actual data, it is necessary to copy the data of the buffer volume 22 to the snapshot volume 23 before copying the data from the master volume 21 to the buffer volume 22 for keeping the volume image of the snapshot volume 23.

The procedure of storing data to the snapshot volume 23 is similar to that of the conventional snapshot action. That is, in step 66 of FIG. 9, the address conversion device 27 searches the allotment managing table 272 and determines the area to be used this time among the unused area of the common volume 24. Then, the data duplication control device 26 copies the existing data on the corresponding page of the buffer volume 22 to the unused area of the common volume 24. Further, the address conversion device 27 sets the value "1" in the corresponding section of the allotment managing table 272 for indicating that it is already used. The address conversion device 27 sets the page address of the common volume 24, which is allotted this time, to the corresponding section of the directory 271. Further, the data duplication control device 26 sets the value "1" in the corresponding section of the difference managing table 263 for indicating existence of data.

After saving the data from the buffer volume 22 to the snapshot volume 23 in this way, the data duplication control device 26 copies the data from the master volume 21 to the buffer volume 22 (step 67), and the temporary data duplication control device 25 sets the value "0" in the temporary difference managing table 251 for indicating that the data of the master volume 21 and the data of the buffer volume 22 are consistent (step 68). Then, it proceeds to the next page (step 70) and repeats a series of processing starting from the step 60.

When it is judged in the processing of step 65 shown in FIG. 9 that the master volume 21 holds the actual data, the processing is shifted to step 69 of FIG. 9 where the data duplication control device 26 copies the data from the master volume 21 to the buffer volume 22. Then, in step 71 of FIG. 9, the data duplication control device 26 updates the contents of the duplication reference table 264 by setting the value "0" in the duplication reference table 264 for indicating that the buffer volume 22 is the reference target of the actual data of the snapshot volume 23.

At the point where the processing of the step 71 is completed, the processing is shifted to the step 68 of FIG. 9. In the step 68 of FIG. 9, the temporary data duplication control device 25 updates the contents of the temporary difference managing table 251 by setting the value "0" in the temporary difference managing table 251 for indicating that the data of the master volume 21 and the data of the buffer volume 22 are consistent. At the point where the processing of the step 68 is completed, a series of the processing is shifted to perform the processing on the next page (step 70), and repeats the series of processing starting from the step 60.

Next, by referring to FIG. 10, there will be described the read command processing on the snapshot volume 23, generated after receiving the snapshot command. The read command processing is executed, for example, when backing up the data using the snapshot volume 23 or when evaluating a new system by using the old data that has been actually used in the past.

Figure 10:
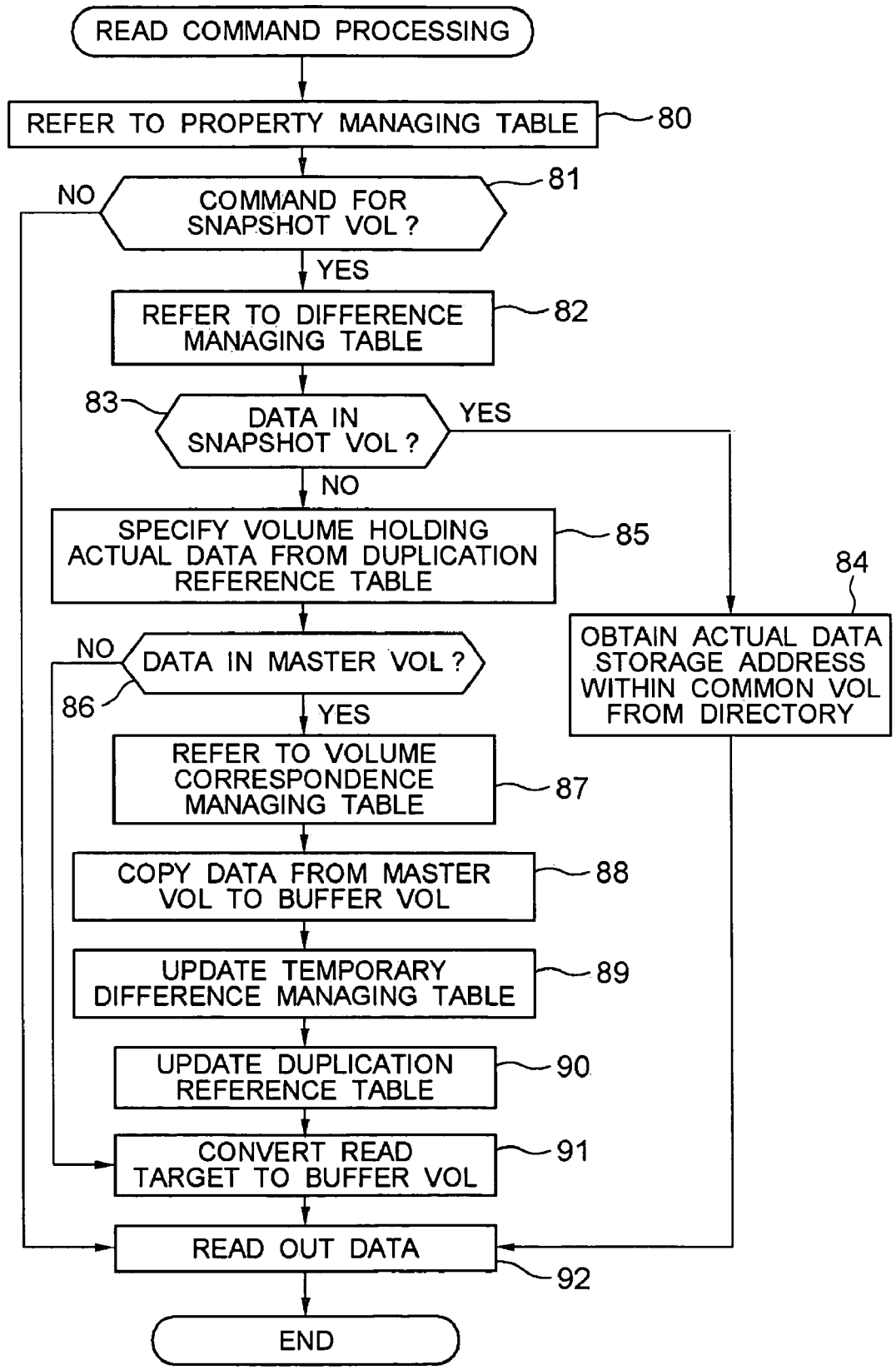
FIG. 10 is a flowchart for showing a read command action of the disk array subsystem according to the embodiment.
Figure 11:
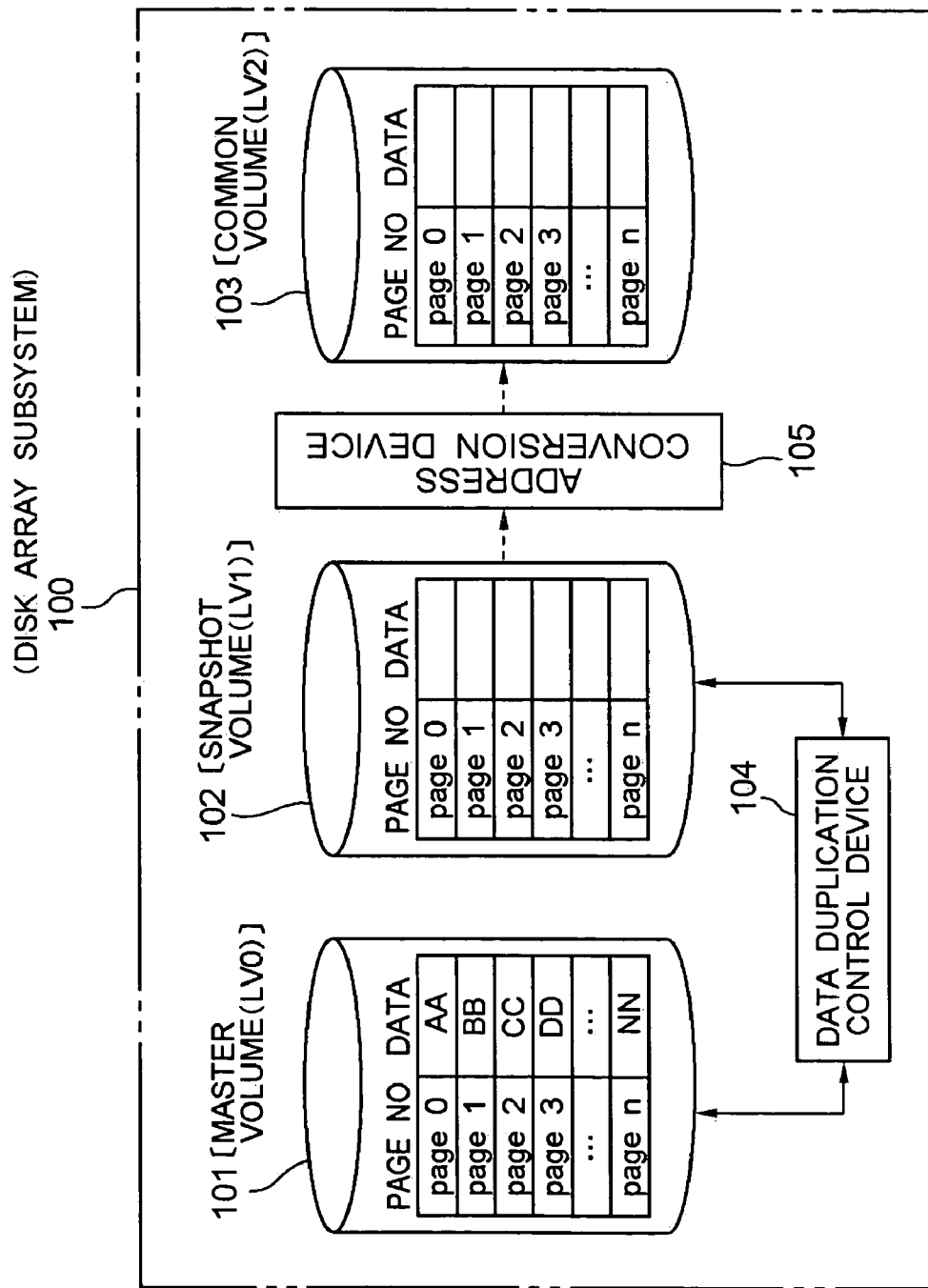
FIG. 11 is a functional block diagram for showing a specific example of snapshot action in a conventional disk array subsystem.
Figure 12:
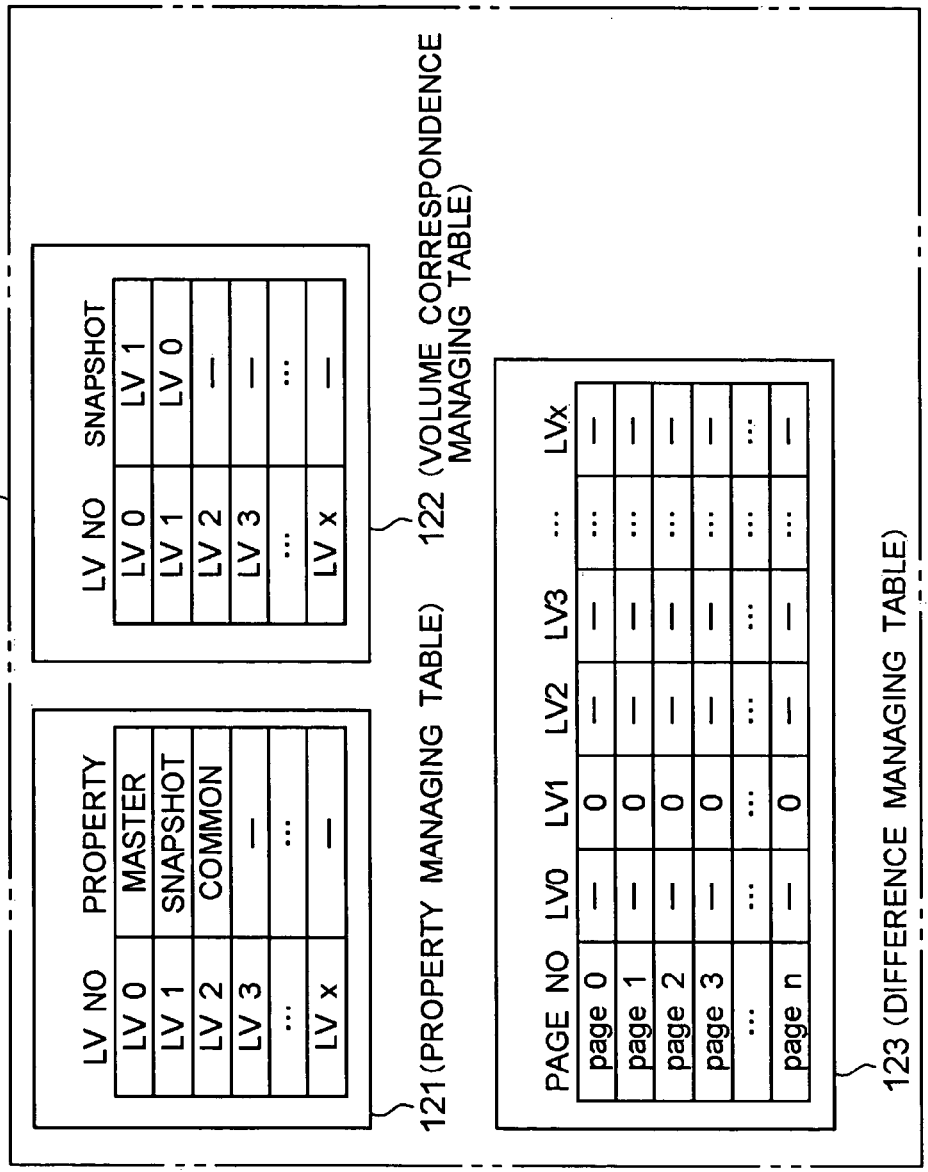
FIG. 12 is a functional block diagram for showing a data duplication control device of the conventional disk array subsystem.

In FIG. 10, when the disk array subsystem 10 receives the read command for the snapshot volume 23, the data duplication control device 26 refers to the property managing table 261 in step 80 of FIG. 10. The data duplication control device 26 judges in step 81 of FIG. 10 whether or not the read command is a command for the snapshot volume 23. When it is judged in step 81 of FIG. 10 that the read-target volume is not the snapshot volume 23, the data duplication control device 26 advances the processing to step 92 to read out the data from the volume to which the read command is issued, and ends the processing.

When it is judged in the step 81 of FIG. 10 that the read command is for the snapshot volume 23, the data duplication control device 26 shifts the processing to step 82 to refer to the difference managing table 263, and judges whether or not a value for indicating presence of data is set in the page of the snapshot volume 23 to be read out currently (step 83).

When it is judged that the snapshot volume 23 holds the data, the data duplication control device 26 shifts the processing to step 84. In the step 84, the address conversion device 27 obtains, from the directory 27, the number and the page address of the common volume where the data is actually stored. Then, the address conversion device 27 reads out the data of the corresponding page (step 92), and ends the processing.

When it is judged that the snapshot volume 23 does not hold the data, the processing is shifted to step 85. In the step 85, the data duplication control device 26 refers to the duplication reference table 264, and judges whether the physical data the volume image of the snapshot volume 23 is referring to is in the master volume 21 or in the buffer volume 22 (step 86).

In step 86, when there is a value set in the duplication reference table 264 for indicating that the physical data is in the buffer volume 22, the data duplication control device 26 shifts the processing to step 91. The data duplication control device 26 converts the issuance target of the read command to the buffer volume 22 by referring to the volume correspondence managing table 262 (step 91), and reads out the data of the target page (step 92). Thereby, the processing is ended.

When it is judged in the step 86 that the physical data the volume image of the snapshot volume 23 is referring to is in the master volume 21, the data duplication control device 26 specifies, from the volume correspondence managing table 262, the buffer volume 22 as a pair of the master volume 21 (step 87), and copies the data from the master volume 21 to the buffer volume 22 (step 88).

The processing is shifted to step 89 where the temporary data duplication control device 25 updates the contents of the temporary difference managing table 251 by setting the value "0" in the temporary difference managing table 251 for indicating that the data of the master volume 21 and the data of the buffer volume 22 are consistent. After completing the update, the processing is shifted to step 90 where the data duplication control device 26 updates the contents of the duplication reference table 264 by setting the value "0" in the duplication reference table 264 for indicating that the actual data reference target of the snapshot volume is the buffer volume. Then, the data duplication control device 26 shifts the processing to step 91. By referring to the volume correspondence managing table 262, the data duplication control device 26 converts the issuance target of the read command to the buffer volume 22 (step 91), and reads out the data of the target page (step 92). Thereby, the processing is ended.

As described above, the embodiment of the present invention comprises the temporary data storage area for temporarily holding the master data, which is provided between the original master data and the duplication data storage area. Thus, it is possible to cut the processing for copying the non-updated data to the duplication data storage area when there is a write request generated for the original master data. Furthermore, when there is a read request for the duplication data storage area, it is possible to cut the read processing from the original master data. As a result, I/O load upon the master data can be decreased dramatically.

The present invention can be utilized in use for backup and the like of a volume level in a disk array subsystem.

What is claimed is:

1. A data duplication system used for a storage device which stores master data in a duplication data storage area when updating the master data, the data duplication system comprising:

a temporary storage area secured in the storage device for temporarily storing the master data to be stored in the duplication data storage area;

a temporary data duplication control device for storing the master data in the temporary storage area; and a data duplication control device for determining a read-out target of the master data when reading out the master data via the duplication data storage area, wherein the data duplication control device comprises a read-out data managing table that holds a read-out target of data not stored in the duplication data storage area, and determines a storage-target of the master data by judging bit in the read-out data managing table.

2. The data duplication system as claimed in claim 1, wherein the temporary data duplication device comprises a duplication data managing table that holds position of the master data to be duplicated to the temporary storage area, and starts duplication of the master data to the temporary storage area by judging bit in the duplication data managing table.

3. The data duplication system as claimed in claim 1, wherein the read-out target of the master data when reading out the master data via the duplication data storage area has data read from the duplication data storage area rather than an original master data.

4. A data duplication method which manages data when storing master data in a duplication data storage area for updating the master data, the data duplication method comprising the steps of:

a preparatory step for securing a temporary storage area for temporarily storing the master data to be stored in the duplication data storage area;

a temporary storing step for storing the master data in the temporary storage area; and a data duplication step for determining a read-out target of the master data when reading out the master data via the duplication data storage area, wherein, in the data duplication step, a read-out data managing table that holds a read-out target of data not stored in the duplication data storage area is formed, and a storage-target of the master data is determined by judging bit in the read-out data managing table.

5. The data duplication method as claimed in claim 4, wherein, in the temporary storing step, a duplication data managing table that holds position of master data to be duplicated in the temporary storage area is formed, and duplication of the master data to the temporary storage area is started by judging bit in the duplication data managing table.

6. The data duplication system as claimed in claim 4, wherein the read-out target of the master data when reading out the master data via the duplication data storage area has data read from the duplication data storage area rather than an original master data.

7. A computer readable recording storage medium with a computer program recorded thereon for data duplication system that allows a computer, which constitutes a data duplication system of a storage device that stores master data in a duplication data storage area when updating data of the master data, to execute:

a function of securing a temporary storage area in the storage device for temporarily storing the master data to be stored in the duplication data storage area;

a function of temporarily storing the master data in the temporary storage area; and a function of determining a read-out target of the master data when reading out the master data via the duplication data storage area, which allows the computer to form a read-out data managing table for holding a read-out target of data not stored in the duplication data storage area, and execute the function of determining a storage-target of the master data by judging bit in the read-out data managing table.

8. The program for data duplication system as claimed in claim 7, which allows the computer to form a duplication data managing table that holds position of master data to be duplicated to the temporary storage area, and execute the function of starting duplication of the master data to the temporary storage area by judging bit in the duplication data managing table.

9. The data duplication system as claimed in claim 7, wherein the read-out target of the master data when reading out the master data via the duplication data storage area has data read from the duplication data storage area rather than an original master data.

* * * * *

UNITED STATES PATENT AND TRADEMARK OFFICE
CERTIFICATE OF CORRECTION

PATENT NO. : 7,587,562 B2 Page 1 of 1
APPLICATION NO. : 11/384412
DATED : September 8, 2009
INVENTOR(S) : Nagumo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this

Twenty-first Day of September, 2010

David J. Kappos
*Director of the United States Patent and Trademark Office*